(12) United States Patent
Klinkenberg

(10) Patent No.: US 6,534,932 B1
(45) Date of Patent: Mar. 18, 2003

(54) METHOD AND ARRANGEMENT FOR MONITORING A GAS DISCHARGE LAMP

(75) Inventor: Klaus Klinkenberg, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 10 days.

(21) Appl. No.: 09/632,754

(22) Filed: Aug. 4, 2000

(30) Foreign Application Priority Data

Aug. 7, 1999 (DE) .......................................... 199 37 422

(51) Int. Cl.[7] .................................................. G05F 1/00
(52) U.S. Cl. ........................ 315/307; 315/224; 315/291
(58) Field of Search ................................ 315/307, 316, 315/119, DIG. 7, 291, 210, 224, 245, 82, 83, 241 R, 244

(56) References Cited

U.S. PATENT DOCUMENTS 5,239,234 A * 8/1993 Pischke et al. ............. 315/119
6,181,086 B1 * 1/2001 Katyl et al. ................. 315/307
6,232,728 B1 * 5/2001 Yamamoto et al. .......... 315/307

FOREIGN PATENT DOCUMENTS

DE 19715254 10/1998 .......... H05B/41/36

* cited by examiner

*Primary Examiner*—Don Wong
*Assistant Examiner*—Jimmy T. Vu

(57) ABSTRACT

A method of monitoring a gas discharge lamp, in which method an electrical test value related to the lamp operating voltage is detected, and to an arrangement for monitoring a gas discharge lamp comprising a control circuit for detecting an electrical test value related to the lamp voltage. A warning signal is generated when a test value is measured which corresponds to a clear reduction in the lamp voltage, for the purpose of better predicting the life of the lamps and the risk of explosion. The electrical test value may either be proportional (for example, a voltage which can be easily measured outside the lamp and which is preferably directly proportional to the lamp voltage) or inversely proportional (for example, the current supplied to the lamp) to the lamp voltage (burning voltage).

26 Claims, 3 Drawing Sheets

METHOD AND ARRANGEMENT FOR MONITORING A GAS DISCHARGE LAMP

BACKGROUND OF THE INVENTION

This invention relates to a method of monitoring a gas discharge lamp, in which method an electrical test value (M) relating to the lamp voltage is detected, as well as to an arrangement for monitoring a gas discharge lamp comprising a test circuit for detecting an electrical test value relating to the lamp voltage.

The end of life of a high-pressure gas discharge lamp with an internal lamp pressure of more than 200 bar (for example a UHP lamp) is often characterized by an explosion of the lamp bulb. Such UHP lamps consist substantially of an approximately spherical quartz bulb in which tungsten electrodes are laterally sealed in so as to have an interspacing of 1.0 to 1.3 mm. A gas discharge is built up between these electrodes which, in combination with an upward convection flow, can bring the upper bulb surface to temperatures close to the melting point of the quartz from which the bulb wall is made. The electrode spacing increases during lamp life owing to the removal of tungsten from the electrode tips. Since the lamps are controlled to a constant power, the voltage in the lamp (the burning voltage) increases. In the case of an explosion, the housing parts surrounding the lamp are contaminated with glass fragments and materials present in the interior of the lamp (for example, mercury and other filling ingredients). This is why known lamps are preferably accommodated in closed reflectors.

The incorporation of a lamp of high power in a closed reflector is very difficult in small reflector systems on account of thermal aspects. The use of a pierced front plate with the free lamp end outside the reflector for reducing the thermal problems has the disadvantage that some explosion products may leave the reflector and cause damage inside the housing (for example, a projector).

The German patent document laid open to public inspection DE 197 15 254 discloses the use of a ballast designed for the operation of gas discharge lamps also for the purpose of monitoring lamp life. To detect lamp deterioration, and to render possible a timely exchange of lamps in the case of high-pressure gas discharge lamps, the ballast is provided with a monitoring circuit which detects a rise in the burning voltage (i.e. stable operating voltage) of the discharge lamp for a longer period in excess of a limit value and which switches off the ballast when this is necessary. The ballast comprises the functions necessary for operating a gas discharge lamp in known manner (for example, providing the operating power and an ignition device). In addition, the ballast comprises a monitoring unit (control circuit) with a monitoring circuit for the burning voltage and a timer circuit. The monitoring circuit detects the voltage across the gas discharge or some other voltage related thereto. When the burning voltage exceeds a programmable limit value, the monitoring circuit issues a signal at its output. This signal does not immediately serve to block or inactivate the supply source of the lamp, but it is first tested for its time gradient by means of the timer circuit. Once the signal has persisted for a given time period, the supply source is switched off.

Methods and arrangements for monitoring gas discharge lamps in accordance with the present state of the art monitor the burning voltage of the lamp only as regards its rise until a limit value is reached. Such methods are useful for those lamps whose burning voltage rises through lamp life because of deteriorating electrodes. The passing of a limit value can be used as the switch-off signal so as to avoid a destruction of the lamp. Often gas discharge lamps do not achieve the maximum lamp life characterized by a maximum voltage because the lamp is destroyed earlier by other causes. Thus blackening at the inside of the discharge vessel (lamp bulb) arises before the maximum voltage is reached, in particular in the case of an imperfect filling of the lamp. This leads to a volume increase of the lamp bulb (continuous inflation), and thus to a pressure drop. Since the burning voltage does not rise any further because of the pressure drop, in spite of a further increase in the electrode spacing, the risk of lamp explosion cannot be detected by known monitoring devices.

SUMMARY OF THE INVENTION

It is accordingly an object of the invention to better monitor the operation of gas discharge lamps. In particular, to better predict lamp life and explosion risks.

The object of the invention is achieved in that a warning signal is generated when a test value relating to a clear decrease in the lamp voltage is detected. The electrical test value may either be proportional (for example, a voltage outside the lamp which can be measured in a simple manner and which preferably is directly proportional to the lamp voltage), or inversely proportional (for example, the current supplied to the lamp) to the stable operating lamp voltage or burning voltage. The method proposed here, in contrast to known methods, does not detect a rise or a gradient which is substantially constant in time, but a gradient in time of the lamp voltage with a negative tendency. The clear decrease may be detected in particular on the basis of a characteristic negative tendency of the lamp voltage. As an additional characteristic for the time gradient of the lamp voltage, for example, the occurrence of a negative slope over a certain period, a given, adjustable absolute value, or a combination of the two may be utilized.

It is provided in an embodiment of the invention that the test value is compared with a reference value, that a differential value corresponding to the deviation of the test value from the reference value is formed for each test value, and that a warning signal is generated when a test value corresponding to an adjustable maximum differential value is detected. The reference value is time-dependent because it preferably corresponds to a standard value expected for the relevant lamp at a given moment in time. Such standard values may be derived from measurements of similar lamps. A further possibility is a decision to generate the warning signal on the basis of a detected minimum value of the lamp voltage. This minimum value may also be coupled to the relevant reference value with time dependence. The minimum value corresponds to a minimum of the lamp voltage at which the lamp has to be switched off and replaced for reasons of safety.

In a preferred further embodiment of the invention, it is provided that a microprocessor contained in a ballast unit suitable for operating the gas discharge lamp receives the test value, carries out the detection of the test value corresponding to a clear decrease in the lamp voltage, and generates the warning signal when such a test value is detected. A microprocessor is usually present in known electronic ballast used for operating gas discharge lamps, which microprocessor controls the ignition voltage, frequency, pulse height, and power and which switches the lamp back to half power in the case of a low supply voltage. This microprocessor is usually constructed or may be modified in a simple manner such that it can carry out the additional function of monitoring the gas discharge lamp in accordance with the invention.

In an advantageous embodiment of the method according to the invention, the microprocessor receives the test value at regular time intervals, does not utilize the test values received during an adjustable burning-in phase of the gas discharge lamp for determining the test value corresponding to a clear reduction in lamp voltage, determines the rise of the test value from five consecutive test values each time, and generates the warning signal when a negative gradient of the test value is detected. These functions can be carried out by a usual microprocessor. The microprocessor receives a test value at moments which can be set by means of the supply frequency and a counter, and deposits it in a memory (for example a register). A time for the burning-in phase of the lamp can be set in a similar manner. The first hours are characterized by a burning-in phase of the lamp, in which voltage fluctuations may occur which should not be taken into account, so that a first test value is not stored until after this period (for example 2000 h). Once five test values have been stored in the memory, the microprocessor determines the gradient of the test value by means of usual mathematical processes. The number of the test values and their frequency in time may obviously be adapted in dependence on the required accuracy and on the power of the microprocessor used. When a negative gradient is detected, an output of the microprocessor becomes active, and the warning signal is generated thereby.

Furthermore, the object of the invention is achieved by means of an arrangement in which the control circuit is designed for generating a warning signal when a clear reduction in the test value corresponding to the lamp voltage is detected. The control circuit may be realized, for example, by a suitably adjusted microprocessor, a logic circuit with fixed wiring, or in analog circuitry. Advantageous embodiments of the device according to the invention are indicated in the dependent claims.

The method and arrangement according to the invention for monitoring a gas discharge lamp render possible a highly reliable prediction of explosions and can thus achieve a timely switching-off of the lamp. It is immaterial here whether the thermal load is caused by processes inside the lamp (for example, recrystallization owing to blackening) or also partly by external loads (for example, failure of the appliance cooling). The burning voltage of the discharge lamp refers to the (stable) operating voltage of the discharge lamp which is present subsequent to the ignition phase of the lamp.

BRIEF DESCRIPTION OF THE DRAWING

An embodiment of the invention will now be explained in more detail below with reference to drawings, in which.

BRIEF DESCRIPTION OF THE PREFERRED EMBODIMENTS

Figure 1:
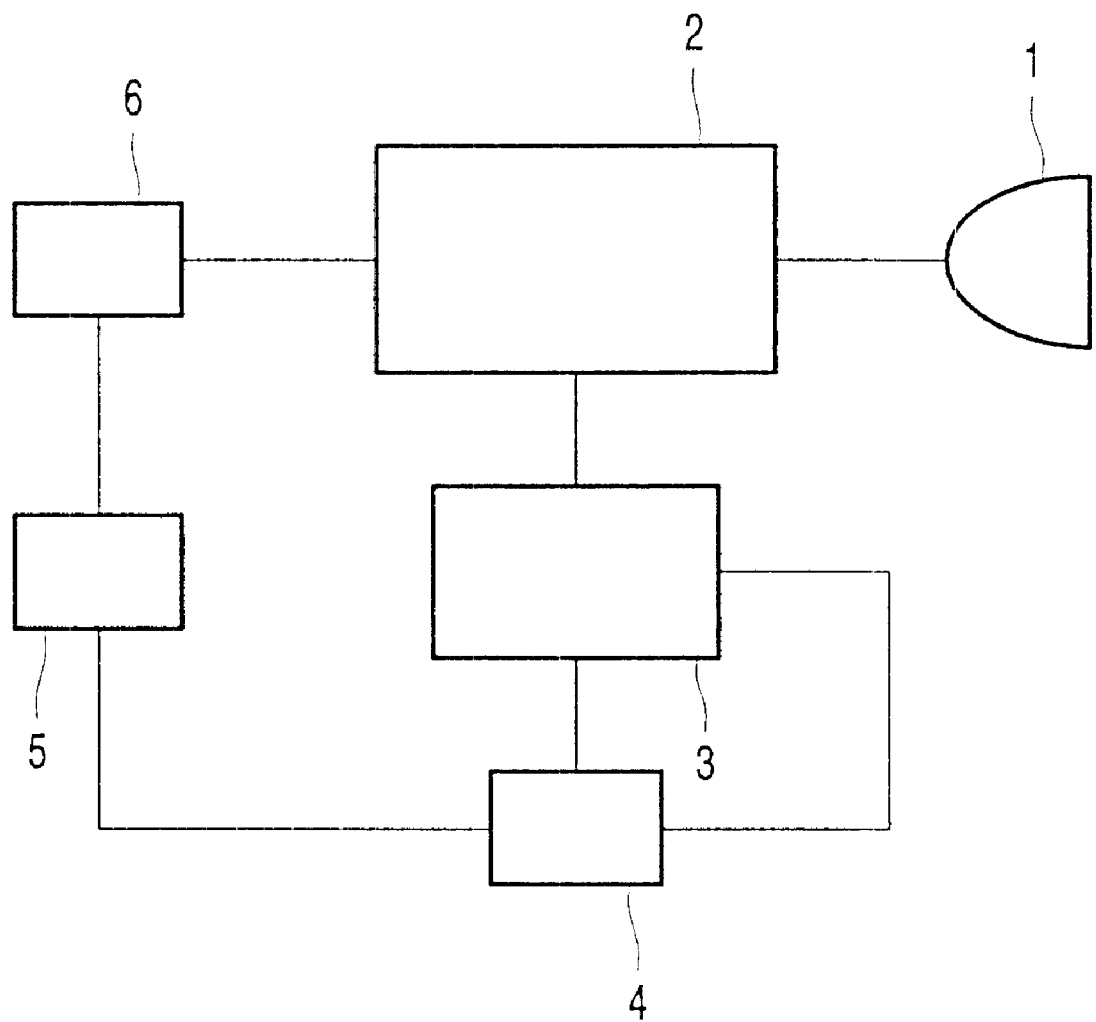
FIG. 1 is a block diagram of an arrangement for monitoring a gas discharge lamp.

FIG. 1 is a block diagram of an arrangement according to the invention for monitoring a UHP gas discharge lamp 1. An electronic ballast 2 delivers all supply voltages necessary for operating the UHP lamp 1 in a known manner. A voltage measuring device 3 measures the voltage supplied to the UHP lamp 1. A microprocessor 4 receives the measured voltage values at adjustable moments which are indicated to the voltage measuring device 3 by means of a control signal. Obviously, the voltage measuring device 3 and the microprocessor 4 may be integrated or incorporated into the ballast 2, in contrast to the representation in separate blocks chosen here for simplicity's sake. A display device 5 is connected to an output of the microprocessor 4 and signals by optical means when a lamp exchange is to be carried out. The microprocessor 4 emits a display signal for this purpose. The display may be formed, for example, by a simple, color-coded LED or by an LCD indicator. In particular, the display device 5 need not necessarily be positioned in the vicinity of the UHP lamp 1. An acoustic signal may be provided instead or in addition. The implementation may be adapted in dependence on the application and the requirements. A switching-off device 6 is also connected to the output of the microprocessor 4. When the microprocessor 4 emits a switch-off signal, the switching-off device 6 triggers the switching-off of the ballast 2 and thus of the lamp 1. Depending on the application, an output of the microprocessor 4 may be utilized for this at which two different signals are emitted, which are processed by the display device 5 and by the switching-off device 6, respectively. Another implementation possibility consists in the use of two independent outputs of the microprocessor 4, each giving off a simple active signal which is supplied to the display device 5 and to the switching-off device 6 through a respective separate line.

The arc length of the gas discharge in the UHP lamp 1 increases during lamp life owing to removal of tungsten at the electrode tips, and thus the thermal load on the bulb upper side caused by the gas discharge in combination with the upward convection flow increases. The bulb upper side starts softening also owing to additional blackening (absorption leading to additional heating) and/or owing to thermally loaded constructional features. Since the temperature at the bulb upper side rises up to close to the melting point of the quartz, the quartz will flow to the extent that the tensile strength of the softening quartz becomes equal to the falling internal pressure. This takes place in conjunction with a voltage drop of the UHP lamp 1, which no longer corresponds to standard values for normal lamp operation and which may thus be used for detecting the inflation of the UHP lamp 1. The UHP lamp 1 is then advantageously switched off so as to exclude an explosion. The moment in time when this effect occurs is dependent on various parameters of lamp and electrode manufacture, on the power and the manner of operation, as well as on the way in which the UHP lamp 1 was incorporated in an optical system. This means that each UHP lamp 1 must be individually monitored.

The voltage gradient of the UHP lamp 1 in time is characterized by a steady rise in voltage, disregarding approximately the first 2000 h. Responsible for this is the continuous removal of tungsten from the molten electrode tips, the rate of which depends on the manner of operation. This leads to an increase in the electrode distance and thus to higher voltage values. The rising voltage gradient in time is dependent on the manner of operation of the lamp. Thus, for example, measurements of two lamps A and B operated in different manners up to approximately 6000 h show a substantially constant voltage gradient, after which the voltage shows a clear drop. This is a sign that the lamp pressure has fallen, caused by an inflation of the lamp bulb. Both lamps are indeed still undamaged after 7000 h, but they show deformations of 0.9 mm and 1.0 mm, respectively. Two lamps C and D, by contrast, show a steady voltage rise up to 4000 h and 5000 h, respectively, and then a clear reduction in voltage. Whereas the lamp C explodes after approximately 6600 h, the lamp D shows a deformation of 0.8 mm after 7000 h. Together with this voltage drop, the luminous fluxes which can be used in an optical system also drop to such an extent that an exchange of the UHP lamp 1 is necessary for this reason, although it is still operating. The voltage drop described above is detected according to the invention in the ballast 2, which comprises a microprocessor 4 which controls the ignition voltage, frequency, pulse height, and power, and which switches back the UHP lamp 1 to half power in the case of a low supply voltage.

Figure 2:
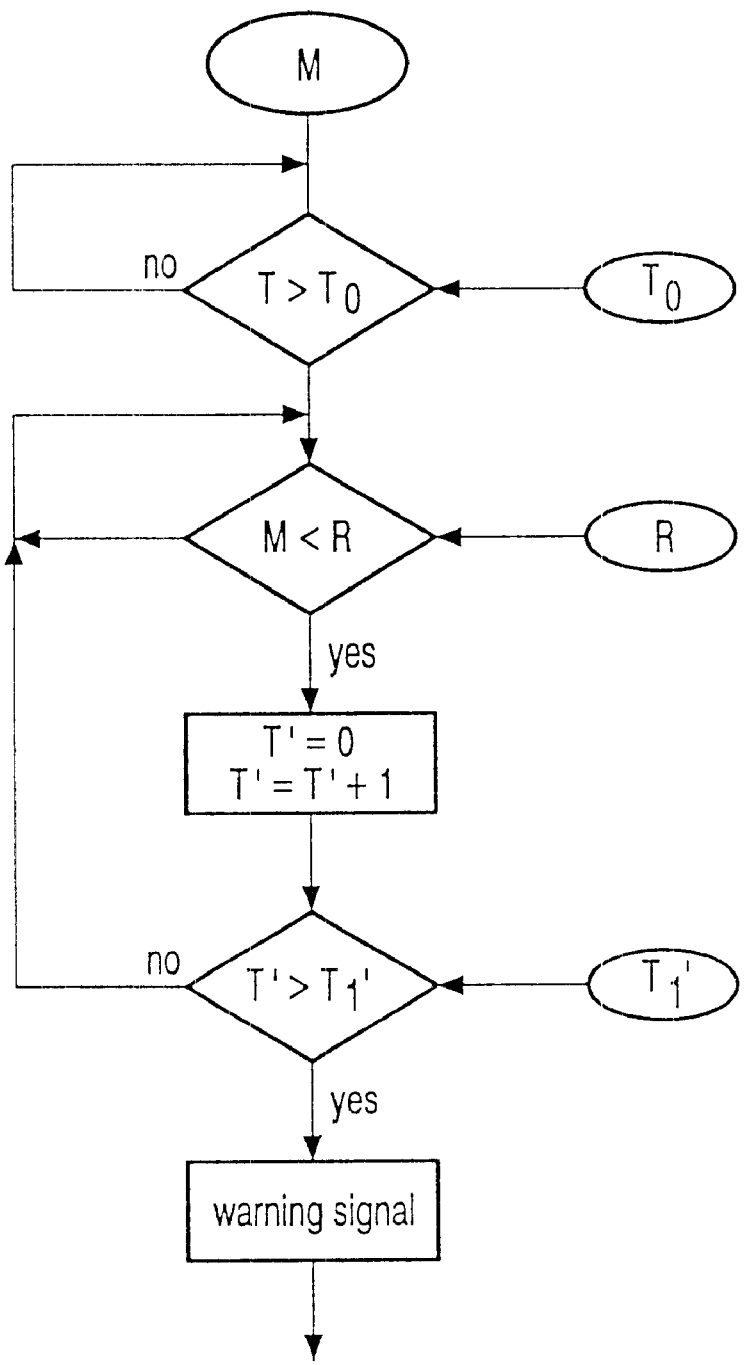
FIG. 2 is a flow chart showing a sequence in the method according to the invention for monitoring a gas discharge lamp.

An embodiment of a monitoring method according to the invention is shown in FIG. 2 in the form of a flow chart. The voltage measuring device 3 supplies a test value M which is received by the microprocessor 4. The microprocessor 4 may include an adjustable time loop which delays the evaluation of the test values M by an adjustable burning-in phase $T_0$. After the burning-in phase $T_0$, the test value M is compared with a reference value R which may be chosen, which is derived from a standard value for the lamp 1 determined from measurements, and which is supplied to the microprocessor 4. The test value M and the reference value R represent a voltage proportional to the burning voltage in the UHP lamp 1 which can be easily measured in the ballast 2. To avoid the voltage changes causing a premature switch-off in the first hours during the burning-in phase $T_0$, the voltage is not measured until after approximately 2000 h at regular time intervals of, for example, 100 h by means of a timer. When a test value M is smaller than the reference value R, a clear reduction in the lamp voltage (burning voltage of the UHP lamp 1) is present. The moment the comparison results in a test value M lower than the reference value R, a delay time T' is reset to the value 0. The delay time T' is compared with an adjustable waiting time $T_1'$. It is tested up to the end of the waiting time $T_1'$ whether the actual test value M remains lower than the reference value R, while the delay time T' is incremented. When the waiting time $T_1'$ has been completed, i.e. the test value M has remained lower than the preset reference value R throughout the set waiting time $T_1'$, a warning signal is generated. The permanent lower level of the test value M compared with the chosen reference value R throughout a chosen period of time here characterizes a clear reduction in the voltage of the UHP lamp 1.

Figure 3:
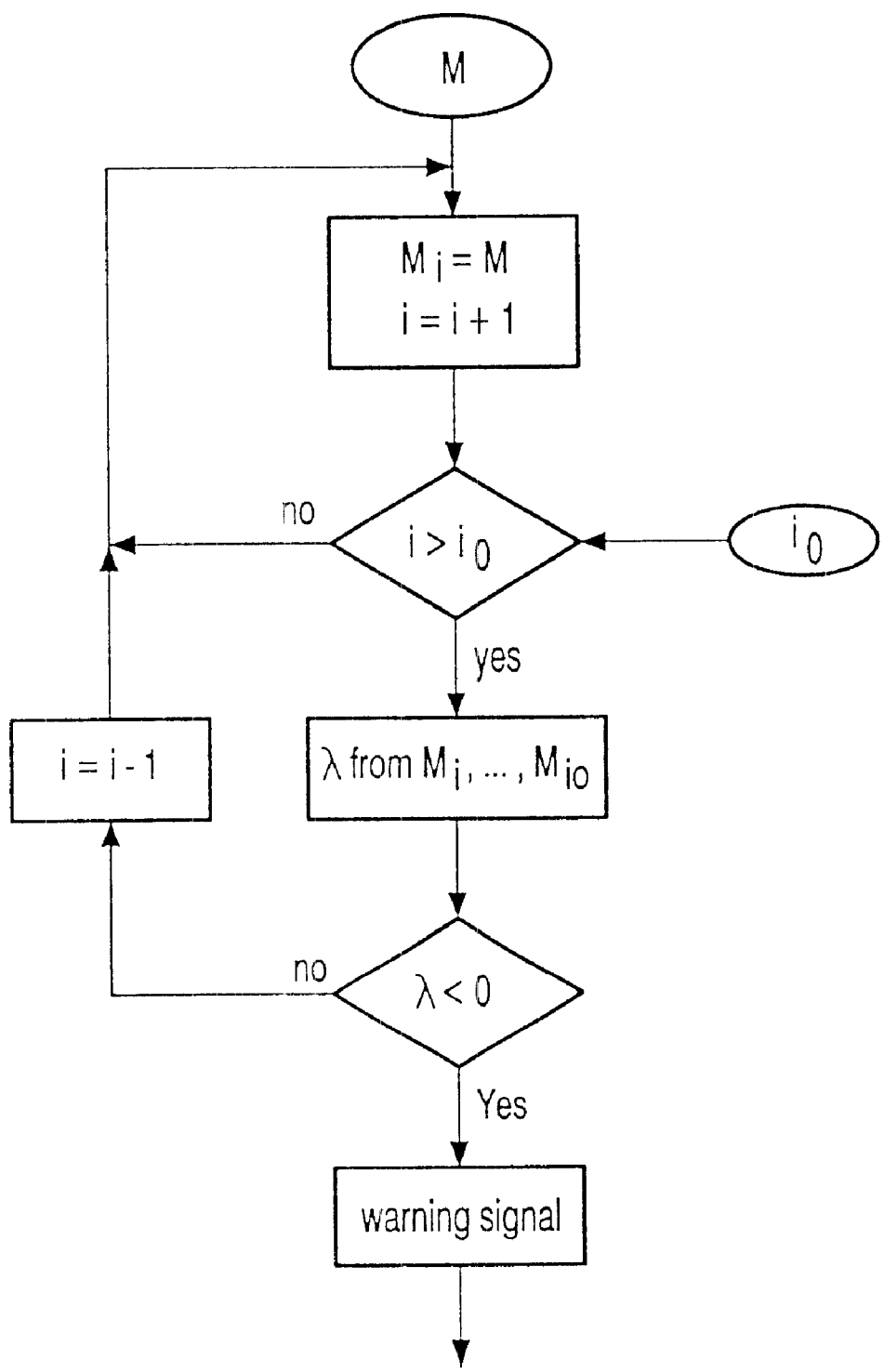
FIG. 3 is a flow chart showing a further sequence in the method according to the invention for monitoring a gas discharge lamp.

FIG. 3 is a flow chart of a further embodiment of the monitoring method according to the invention. A loop for delaying the evaluation of the test values M by an adjustable burning-in phase $T_0$ is not shown, but it may be provided in the microprocessor 4 in the same manner as above. An adjustable number $i_0$ ($i_0$=5 here) of test values $M_i$ is taken up and stored. Once five test values $M_1, \ldots, M_5$ are available, the voltage rise $\lambda$ is calculated from these latest five test values $M_1, \ldots, M_5$. As long as the rise $\lambda$ is positive, the oldest test value $M_i$ is erased, a new test value $M_i$ is received, and the gradient $\lambda$ is calculated again therefrom. The warning signal is generated when a negative gradient $\lambda$ is detected. The involvement of the latest five test values $M_1, \ldots, M_5$ each time suppresses fluctuations in the test values $M_i$ or short-period voltage changes which may arise through material transport at the electrodes. A particularly advantageous calculation of the gradient $\lambda$ of the voltage in time is one operating by first-order regression, since in this method short-period voltage changes and outlier values do not lead to a premature switch-off. It is not until the gradient $\lambda$ thus calculated becomes negative that an indicator for inflation of the lamp bulb is available. This may be used both for displaying a warning for replacement of the lamp 1 and for switching-off so as to avoid an explosion of the lamp 1.

What is claimed is:

1. A method of monitoring a gas discharge lamp which comprises: detecting an electrical test value (M) relating to the lamp operating voltage and, generating a warning signal when a test value relating to a clear decrease in the lamp operating voltage is detected.

2. A method as claimed in claim 1, further comprising; comparing the detected test value (M) with a reference value (R), deriving a differential value corresponding to a deviation of the test value from the reference value for each test value, and generating the warning signal when a test value corresponding to an adjustable maximum differential value is detected.

3. A method as claimed in claim 1, which comprises; generating the warning signal when a test value (M) corresponding to an adjustable minimum value of the lamp operating voltage is detected.

4. A method as claimed in claim 1, which comprises; measuring a voltage related to the lamp operating voltage, and generating the warning signal upon the measurement of a limit value for said related voltage which corresponds to a clear decrease in the lamp operating voltage.

5. A method as claimed in claim 1, which comprises; measuring a current related to the lamp operating voltage, and generating the warning signal upon the measurement of a limit value of said current which corresponds to a clear decrease in the lamp operating voltage.

6. A method as claimed in claim 1, characterized in that a microprocessor incorporated in a ballast unit suitable for operating the gas discharge lamp receives the test value (M), determines the test value corresponding to a clear decrease in the lamp operating voltage, and generates the warning signal when such a test value is detected.

7. A method as claimed in claim 6, characterized in that the microprocessor
receives the test value (M) at regular time intervals,
does not utilize the test values received during an adjustable burning-in phase of the gas discharge lamp,
determines a gradient ($\lambda$) of the test value each time from five consecutive test values, and
generates the warning signal when a negative gradient ($\lambda$) of the test value is detected.

8. An arrangement for monitoring a gas discharge lamp comprising; a test circuit for detecting an electrical test value (M) relating to the lamp stable operating voltage, wherein the test circuit includes means for generating a warning signal when a test value (M) corresponding to a clear reduction in the lamp operating voltage is detected.

9. The arrangement as claimed in claim 8, wherein the test circuit comprises a microprocessor included in a ballast suitable for operating the gas discharge lamp.

10. An arrangement as claimed in claim 9 which further comprises;
means for supplying the test value (M) to the microprocessor at regular time intervals, and the microprocessor
does not utilize the test values received during an adjustable burning-in phase of the gas discharge lamp for determining the test value which corresponds to a clear reduction in the lamp operating voltage,
determines a gradient ($\lambda$) of the test value each time from five consecutive test values, and generates the warning signal when a negative gradient ($\lambda$) of the test value is detected.

11. An apparatus for monitoring a high pressure discharge lamp comprising:
   a ballast circuit for supplying a lamp operating voltage for a high pressure discharge lamp,
   means for detecting an electrical test value related to the lamp operating voltage, and
   means for generating a warning signal upon detection of an electrical test value which corresponds to a clear reduction in the lamp operating voltage.

12. The discharge lamp monitoring apparatus as claimed in claim 11 further comprising;
   means for comparing the electrical test value with an electrical reference value to derive a differential value signal, and wherein
      the generating means, in response to a predetermined differential value signal, generates said warning signal.

13. The discharge lamp monitoring apparatus as claimed in claim 11 wherein the generating means generates the warning signal upon detection of an electrical test value which corresponds to an adjustable minimum value of the lamp operating voltage.

14. The discharge lamp monitoring apparatus as claimed in claim 11 wherein said electrical test value is a voltage related to the lamp operating voltage, and wherein
   the generating means generates the warning signal upon detection of a related voltage indicative of said clear reduction in the lamp operating voltage.

15. The discharge lamp monitoring apparatus as claimed in claim 11 wherein said electrical test value is a current related to the lamp operating voltage, and wherein
   the generating means generates the warning signal upon detection of a related current indicative of said clear reduction in the lamp operating voltage.

16. The discharge lamp monitoring apparatus as claimed in claim 11 further comprising;
   means for delaying generation of said warning signal for a period of time sufficient to allow the lamp operation to stabilize.

17. The discharge lamp monitoring arrangement as claimed in claim 8 further comprising;
   means for delaying generation of said warning signal for a number of hours sufficient to allow the lamp operation to stabilize.

18. The discharge lamp monitoring apparatus as claimed in claim 11 further comprising;
   means for periodically supplying electrical test value signals to the generating means at regular time intervals,
   means for periodically determining a gradient ($\lambda$) of the electrical test value from a plurality of consecutive electrical test value signals, and wherein
      the generating means generates the warning signal upon detection of a negative gradient ($\lambda$) of the electrical test value signals.

19. The discharge lamp monitoring apparatus as claimed in claim 18 wherein;
   said test value signal supplying means periodically adds a test value signal to said plurality of consecutive electrical test value signals and deletes the earliest one of the test value signals of said plurality of consecutive electrical test value signals.

20. The discharge lamp monitoring apparatus as claimed in claim 11 wherein said electrical test value is the discharge lamp operating voltage and which is detected at a moment in time subsequent to the ignition phase of the discharge lamp.

21. The discharge lamp monitoring apparatus as claimed in claim 12 wherein said electric reference value is time dependent.

22. The discharge lamp monitoring apparatus as claimed in claim 11 further comprising;
   means responsive to said warning signal for switching off power to said ballast circuit and to the discharge lamp.

23. A method of monitoring the useful life of a discharge lamp, comprising;
   detecting, subsequent to the ignition phase of the discharge lamp, an electrical test value relating to the lamp operating voltage, and
   generating a warning signal when a test value relating to a clear reduction in the lamp operating voltage is detected.

24. The lamp monitoring method as claimed in claim 23 which further comprises;
   delaying generation of said warning signal for a period of time sufficient to allow the lamp operation to stabilize.

25. The lamp monitoring method as claimed in claim 23 which further comprises;
   periodically determining, from a plurality of consecutive detected test values, a negative gradient ($\lambda$) of the electrical test values, from which the warning signal is generated.

26. The lamp monitoring method as claimed in claim 25 wherein said electrical test values correspond to the discharge lamp operating voltage.

* * * * *